(12) United States Patent
Newton (10) Patent No.: US 7,975,436 B2
(45) Date of Patent: Jul. 12, 2011

(54) UTILITY TRENCH COVER AND MANUFACTURING METHOD

(75) Inventor: Nelson C. Newton, Valley View, TX (US)

(73) Assignee: Advanced Pedestals, Ltd., Gainesville, TX (US)

( * ) Notice: Subject to any disclaimer, the term of this patent is extended or adjusted under 35 U.S.C. 154(b) by 371 days.

(21) Appl. No.: 12/203,471

(22) Filed: Sep. 3, 2008

(65) Prior Publication Data

US 2010/0050545 A1    Mar. 4, 2010

(51) Int. Cl.
*E02D 29/14* (2006.01)

(52) U.S. Cl. .............. 52/20; 52/19; 52/220.3; 52/220.7; 404/25

(58) Field of Classification Search ............... 52/19, 20, 52/220.1, 220.7, 220.3, 263; 49/49; 404/25
See application file for complete search history.

(56) References Cited

U.S. PATENT DOCUMENTS

| | | | | |
|---|---|---|---|---|
| 2,912,197 A * | 11/1959 | Hudson | | 248/49 |
| 2,956,652 A * | 10/1960 | Liskey, Jr | | 52/126.6 |
| 3,435,568 A * | 4/1969 | Hoseason et al. | | 52/220.5 |
| 3,724,148 A * | 4/1973 | Bregenzer | | 52/220.5 |
| 3,975,870 A * | 8/1976 | Naka | | 52/20 |
| 4,124,324 A | 11/1978 | Augis et al. | | |
| 4,353,320 A * | 10/1982 | Sluys | | 114/267 |
| 4,843,781 A * | 7/1989 | Chase, III | | 52/792.11 |
| 5,359,143 A * | 10/1994 | Simon | | 174/101 |
| 5,362,174 A * | 11/1994 | Yang | | 404/25 |
| 5,412,911 A * | 5/1995 | Schlegel | | 52/20 |
| 5,549,411 A * | 8/1996 | Hawkins | | 404/25 |
| 5,628,152 A * | 5/1997 | Bowman | | 52/20 |
| 5,697,729 A * | 12/1997 | Bowman | | 404/25 |
| 5,722,204 A * | 3/1998 | Stieb et al. | | 52/20 |
| 5,810,513 A * | 9/1998 | Beamer et al. | | 405/119 |
| 5,956,230 A * | 9/1999 | Grajewski et al. | | 361/707 |
| 6,150,610 A * | 11/2000 | Sutton | | 174/68.3 |
| 6,288,331 B1 * | 9/2001 | Wirthwein et al. | | 174/481 |
| 6,467,226 B2 * | 10/2002 | Dodson et al. | | 52/220.1 |
| 6,664,467 B1 * | 12/2003 | de la Borbolla | | 174/503 |
| 6,881,083 B2 * | 4/2005 | Vargas et al. | | 439/211 |
| 7,080,954 B2 * | 7/2006 | Monneret et al. | | 404/25 |
| 7,150,131 B2 * | 12/2006 | Barker | | 52/220.5 |
| 7,171,994 B1 * | 2/2007 | O'Brien | | 141/311 A |
| 7,360,343 B1 * | 4/2008 | Spransy et al. | | 52/263 |
| 7,484,908 B2 * | 2/2009 | Stadler | | 404/25 |
| 7,589,286 B2 * | 9/2009 | VanderVelde et al. | | 174/480 |
| 7,621,089 B2 * | 11/2009 | Potter | | 52/480 |
| 7,827,737 B2 * | 11/2010 | Ziobro et al. | | 52/19 |
| 2004/0182021 A1 * | 9/2004 | Barker | | 52/169.1 |

* cited by examiner

*Primary Examiner* — Eileen Lillis
*Assistant Examiner* — Alp Akbasli
(74) *Attorney, Agent, or Firm* — Law Office of Mark Brown, LLC; Mark E Brown (57) ABSTRACT

A cover for a utility trench includes upper and lower surfaces enclosing a hollow cavity, which is subdivided by multiple, transverse channels recessed into an extending transversely across the lower surface. The channels form fused engagements or "kiss offs" with the upper surface, which increase the transverse rigidity of the cover for enhanced load-bearing capacity spanning across the opening formed by the trench. The hollow construction of the cover, which can comprise a suitable plastic, tends to minimize its weight A pair of flanges extend along respective sides of the cover and are bolted to the trench sidewall top edges in overlying relation. A pair of shoulders are formed inside the flanges and are adapted to extend into the trench with the cover positioned thereover. A method of manufacturing a utility trench cover includes rotary molding a hollow cover with kiss offs.

19 Claims, 7 Drawing Sheets

UTILITY TRENCH COVER AND MANUFACTURING METHOD

BACKGROUND OF THE INVENTION

1. Field of the Invention The present invention relates generally to utility trench systems, and in particular to utility trench covers and their manufacturing methods.

2. Description of the Related Art

Utility trenches are used in civil engineering for concealment and protection of infrastructure, such as electrical conduit, electrical and communication cabling, piping, and other utilities. Utility trenches are often created by excavating the earth and placing the infrastructure within a trench enclosure or liner. Such trench enclosures can be constructed on-site or pre-fabricated for placement below grade.

A current type of utility trench system uses modular, pre-fabricated enclosures to protect the infrastructure and sectional covers or grates to cover the enclosures. Modular trench systems can comprise a series of pre-fabricated enclosures arranged longitudinally end-to-end in an excavation area and topped off with a cover. Such enclosures have been widely adopted because of the speed with which then can be installed and because they provide easy access to the infrastructure enclosed therein. Access to the enclosure is expedited by merely removing the sectional enclosure cover.

The enclosures and covers are commonly manufactured using materials that are suitable for their locations and expected uses. Reinforced concrete or masonry materials are often used for trench-lining enclosures. Enclosure covers are often manufactured using reinforced concrete or steel. The resulting enclosure covers can be strong and durable but very heavy. Strong enclosure cover design is important in particular applications in order to support heavy vehicular traffic. For example, electrical utility trenches are commonly used in such facilities as powerplants, electrical distribution substations, factories, etc. Service trucks and other vehicles commonly cross the trench lines and must be supported by their covers.

However, previous steel and reinforced concrete trench covers were cumbersome to remove when trench access was needed. Moreover, electrically conductive materials, such as metal, should be avoided in electrical utility installations due to electrical hazards. Trench enclosure covers should therefore preferably be strong, durable, weather-resistant, non-conductive and lightweight. Installation and removal operations and trench-access procedures should not require multiple personnel and/or hoisting equipment. Moreover, they should be adaptable for both constructed on-site enclosures and pre-fabricated enclosures. Scalability can also be an important consideration in trench enclosure design because trenches of various dimensions can be accommodated with a basic cover design. The present invention addresses these design criteria. Heretofore there has not been available a utility trench cover with the advantages and features of the present invention.

SUMMARY OF THE INVENTION

In the practice of the present invention, a cover is provided for utility trenches and can be constructed of plastic using rotary molding techniques. The cover includes upper and lower panels and a hollow interior. Channels extend across the cover and form "kiss off" areas where the upper and lower panels are fused together during a rotary molding process for providing greater strength. Flanges are formed at the cover periphery and include mounting bolt receivers for receiving bolts anchored into the trench sidewalls.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for reaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Preferred Embodiment Utility Trench Cover 2 and Manufacturing Method

Figure 1:
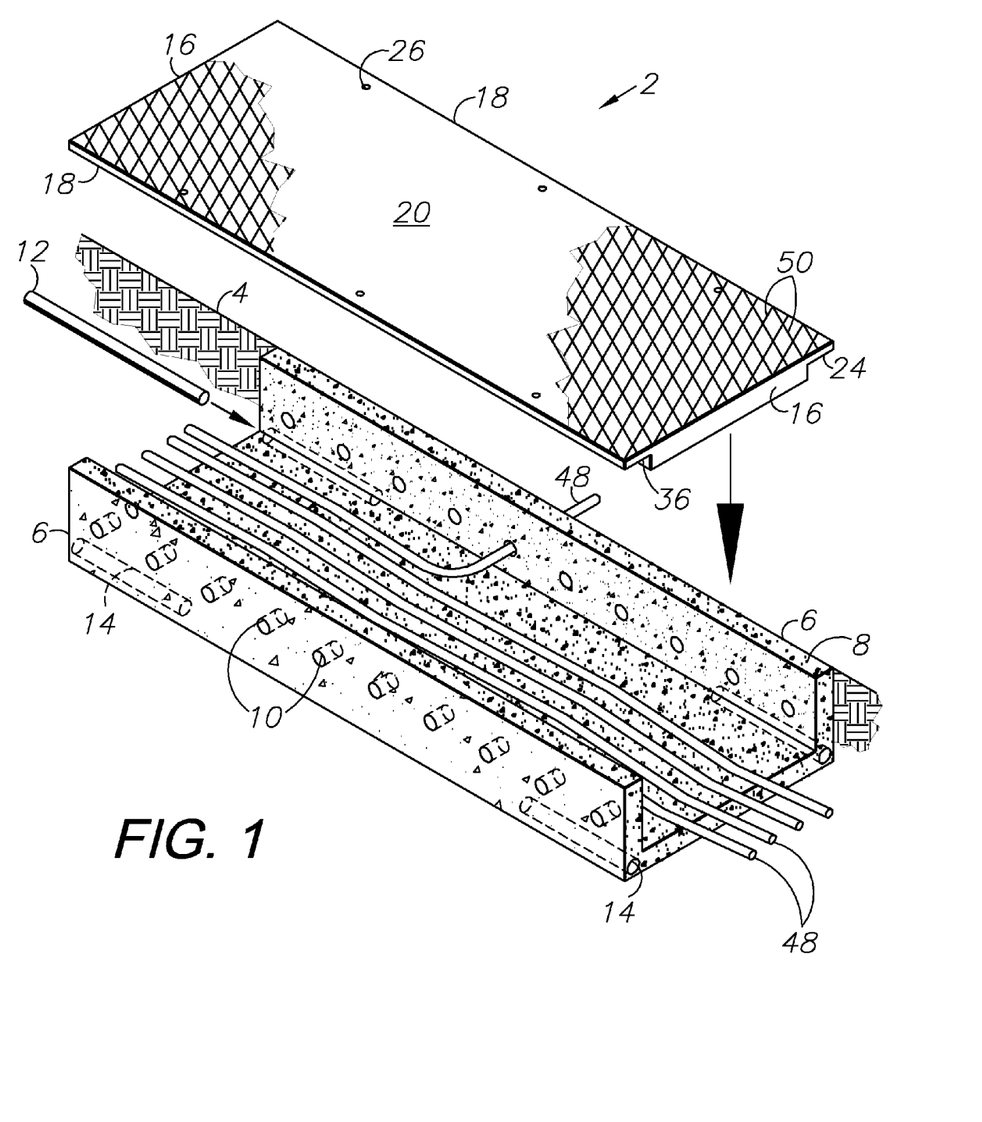
FIG. 1 is a top perspective view of a utility trench cover comprising an aspect of the present invention, shown in position over an open, prefabricated utility trench enclosure.
Figure 2:
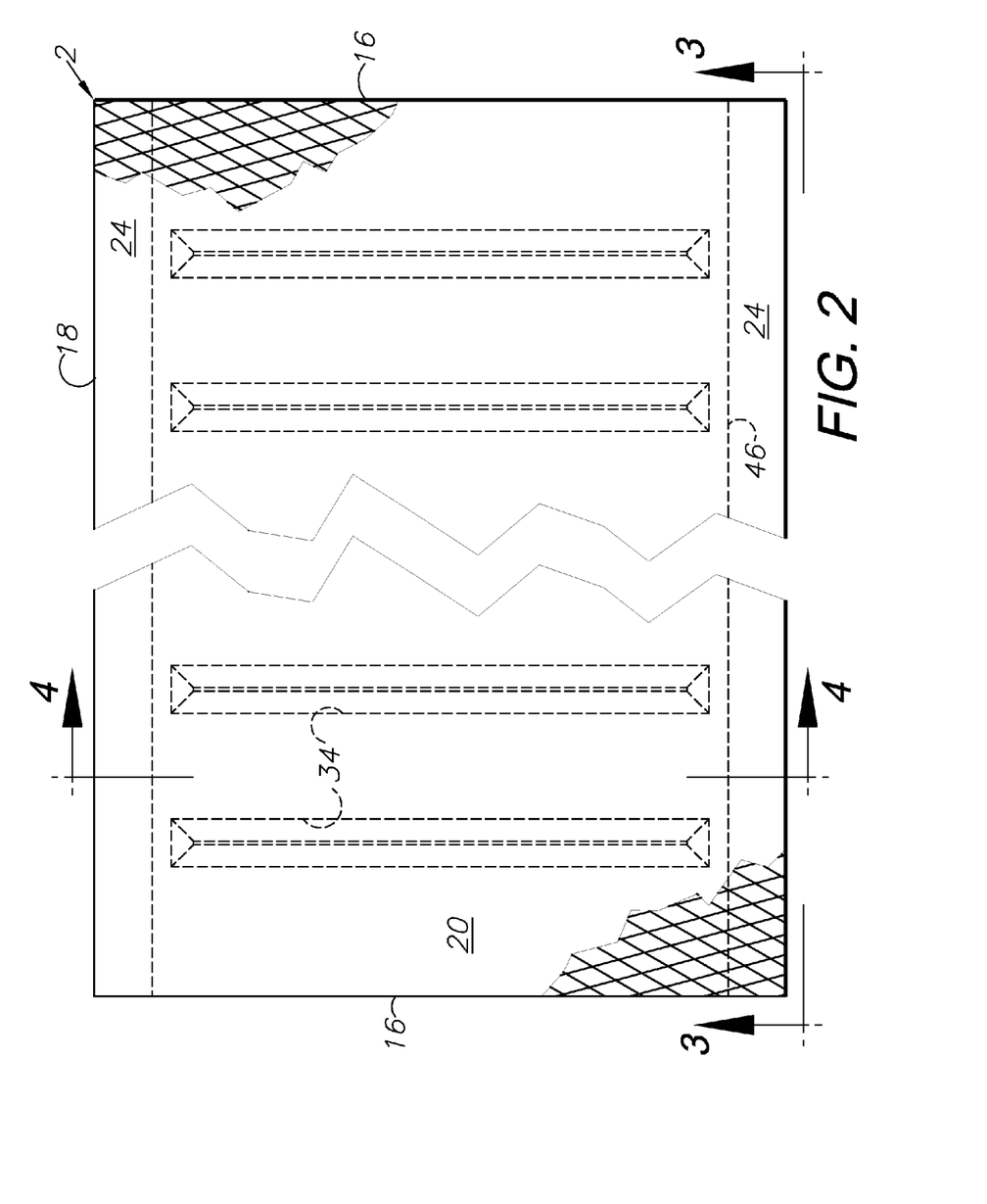
FIG. 2 is a fragmentary, top plan view thereof.
Figure 3:
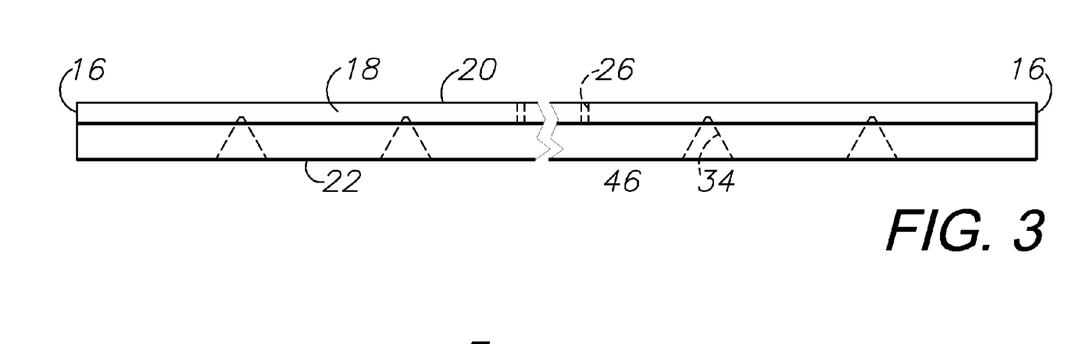
FIG. 3 is a side elevational view thereof taken generally in the direction indicated by arrows 3-3 in FIG. 2.
Figure 4:
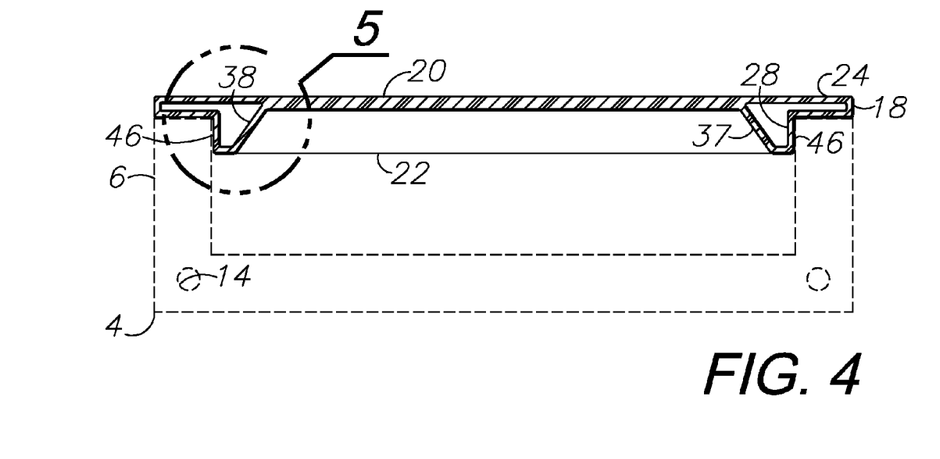
FIG. 4 is a transverse, cross-sectional view thereof taken generally along line 4-4 in FIG. 2.

Referring to the drawings in more detail, the reference numeral 2 generally designates a utility trench cover for a utility trench liner 4 as shown in FIGS. 1-5. Referring to FIG. 1, without limitation on the generality of useful applications of the cover 2, the trench liner 4 includes opposite sidewalls 6 which access ports 10 and end alignment holes 14. The sidewalls 6 include top edges 8 with multiple equally-spaced anchors 44 to facilitate attachment of the cover 2 thereto. The ports 10 accommodate routing infrastructure, such as cables 48, through the sidewalls 6. Alignment holes 14 are located on each end of the trench liner 4 for receiving alignment pins 12 connecting and aligning multiple trench liner sections 4 end-to-end. The trench liner 4 described thus far is generally conventional. In a typical installation, the trench liner 4 would be installed at or below grade with the cover 2 generally at ground level. The trench liner 4 can be constructed primarily of steel-reinforced concrete, or other suitable material using forms constructed on-site, or it can be pre-fabricated off-site prior to placement on-site.

The cover 2 is generally rectangular in shape and includes opposing ends 16 defining an overall length of preferably 95⅝ inches, i.e. slightly less than a nominal or modular length of 8 feet, with ⅜ inches allowance for thermal expansion. Opposing edges 18 define an overall width of approximately 36 inches, and the cover 2 has an overall depth of approximately 2.750 inches (FIG. 9) The dimensions of the cover 2 can vary depending on a particular installation.

The cover 2 is a one-piece enclosed hollow structure with a uniform wall or panel thickness (WT) of preferably 0.250 inches, an interior cavity 28 defined by a cavity surface 38, and an exterior defined by an upper surface 20 of an upper panel 21 and lower surface 22 of a lower panel 23. A relief 50 disposed upon the upper surface 20 is comprised of a plurality of textured, reversed diamond geometric shapes preferably created from a mold having a surface of raised diamond geometric shapes, textured by sandblasting, thereby creating a skid resistant surface. The relief 50 can be a variety of geometric shapes. Further, the upper surface 20 may slightly crown for drainage purposes.

Along each side of the cover 2 a flange 24 extends approximately 3.875 inches from the edge 18. The flange 24 is received on the top edge 8 of the trench 4 whereby the cover 2 substantially covers the opening created by the sidewalls 6. A shoulder 46 protrudes downwardly from each flange 24, extends horizontally along the full length of the cover 2 and terminates at the cover lower surface 22. The shoulder 46 prevents lateral movement of the cover 2 within the trench 4. The cover 2 can be secured to the trench 4 by installing bolts 42 in a plurality of mounting bolt receivers 26, which are located in the flanges 24. The bolts 42 are threadably received by threaded receivers 44 in anchors 45 in the sidewalls 6.

Figure 5:
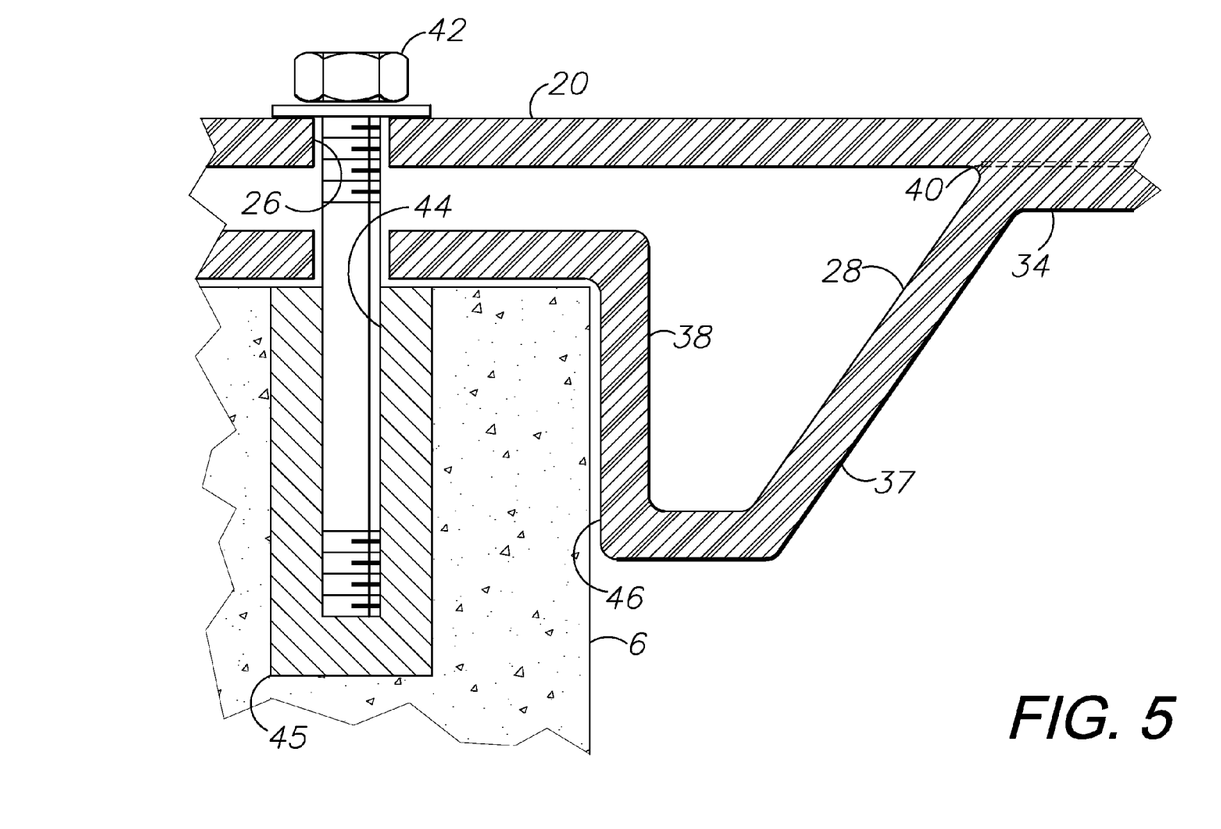
FIG. 5 is an enlarged, fragmentary, cross-sectional view thereof, taken generally within circle 5 in FIG. 4.
Figure 6:
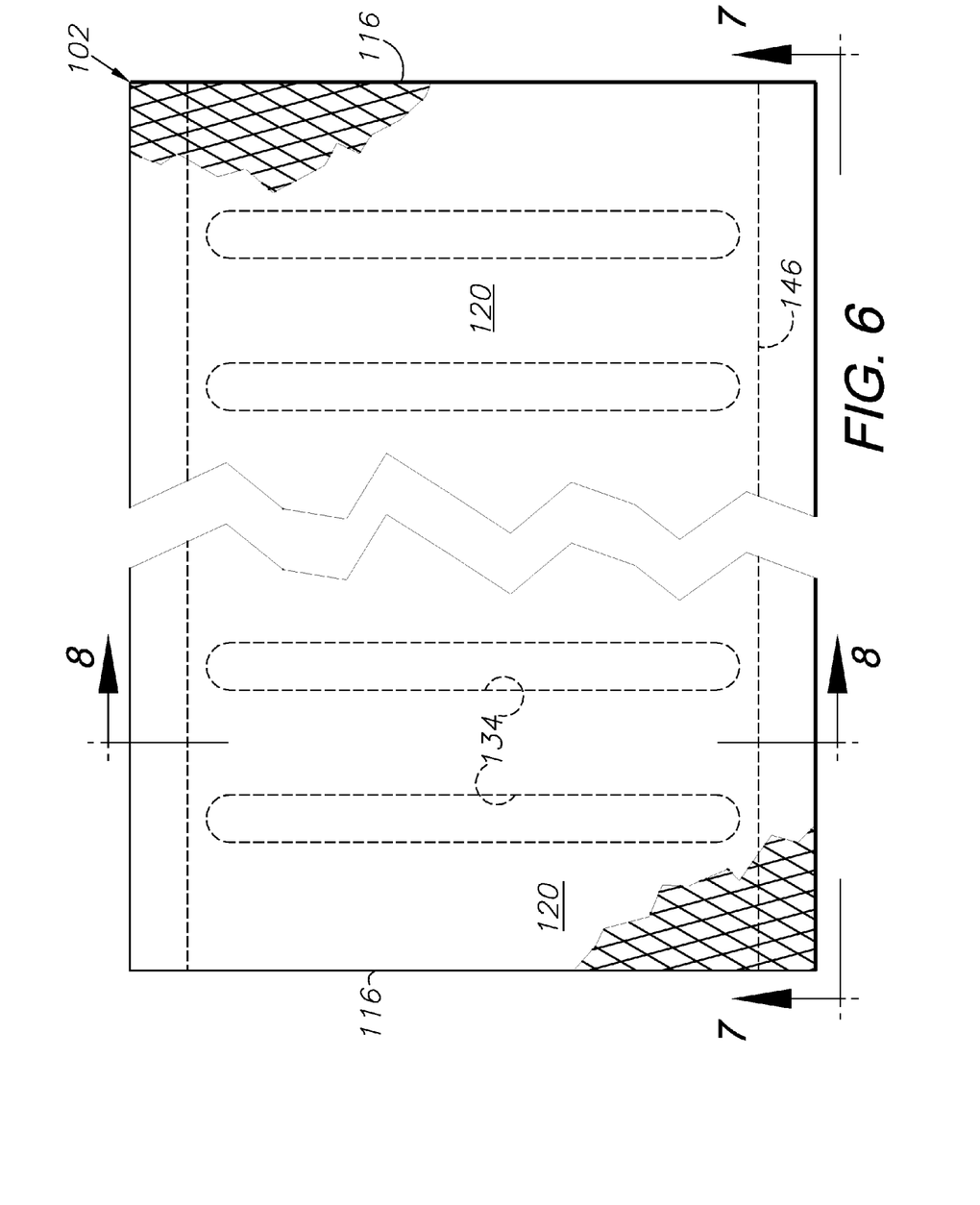
FIG. 6 is a top plan view of a cover comprising an alternative embodiment of the present invention.
Figure 7:
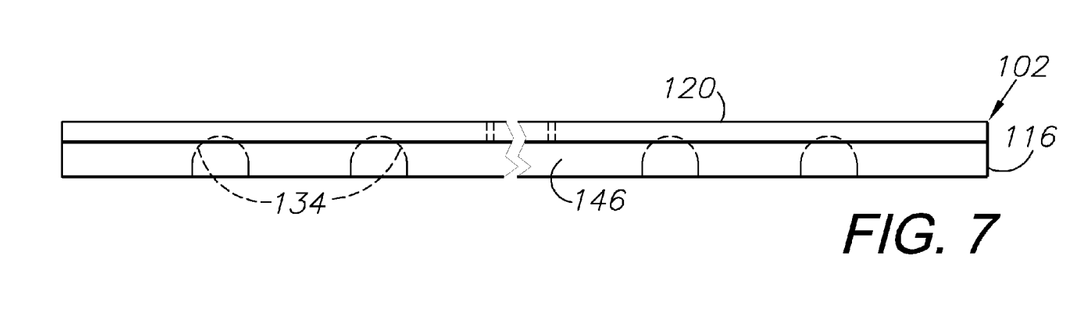
FIG. 7 is a side elevational view thereof taken generally in the direction indicated by arrows 7-7 in FIG. 6.
Figure 8:
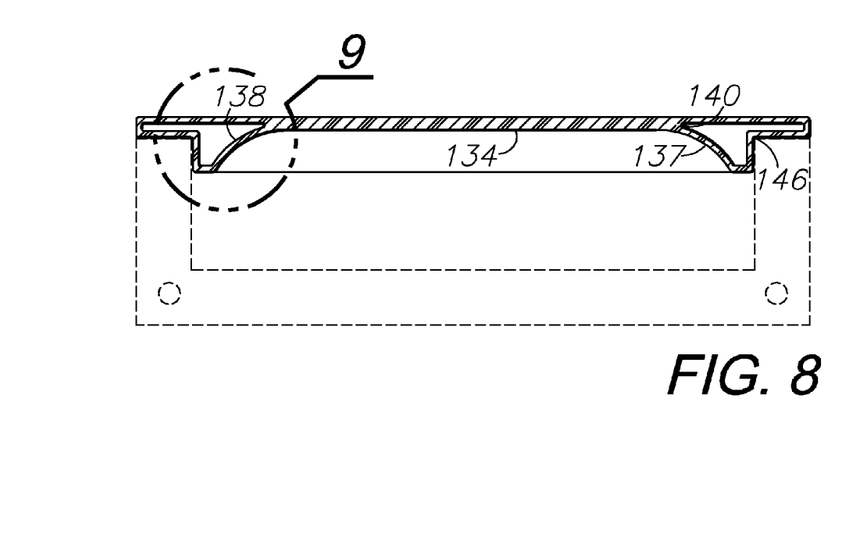
FIG. 8 is a transverse, cross-sectional view thereof taken generally along line 8-8 in FIG. 6.

Elongated, recessed, structural channels 34 with generally triangular cross-sectional configurations, preferably about 26 inches long and 2.5 inches wide, are located at 8.0 inches on centers and are integrally formed with the lower surface 22 of the cover 2. The channels 34 extend slightly less than the width of the cover 2 between the shoulders 46, are substantially parallel to the ends 16 and terminate at sloping braces 37, which are spaced inwardly from the shoulders 46. The cavity surfaces 38 of the channel 34 and the upper panel 21 are fused together at a "kiss off" 40 overlapping by approximately 0.010 inches thereby providing strength and rigidity to the cover 2 (FIG. 5).

The cover 2 can be fabricated from a lightweight thermoplastic or composite material by using a variety of molding and forming Processes, preferably linear low density polyethylene (LLDPE) using rotational molding. The resulting cover 2 is non-conductive, dense and rigid having a high mechanical strength, but is much lighter than traditional concrete or steel trench covers. Therefore, the lightweight cover 2 can be easily positioned and quickly placed upon, or removed from, the trench liner 4. A plurality of covers 2 can be placed longitudinally end-to-end to enclose various lengths of trench liners 4 and can be retrofitted to existing trenches. For example, a nominal 3'×8' cover with a wall/panel thickness (WT) of 0.300 inches weighs approximately 76.5 pounds. The approximate weight for a cover with WT=0.250 inches is 63.5 pounds.

III. Alternative Embodiment Utility Trench Cover 102

An alternative configuration utility trench cover 102, which is similar to the trench cover 2 described above, comprising another embodiment or aspect of the present invention is shown in FIGS. 6-9 and includes a one-piece enclosed hollow structure with a uniform wall or panel thickness (WT) of preferably 0.300 inches and an overall depth of 2.750 inches between an upper surface 120 of an upper panel 121 and a lower surface 122 of a lower panel 123.

Figure 9:
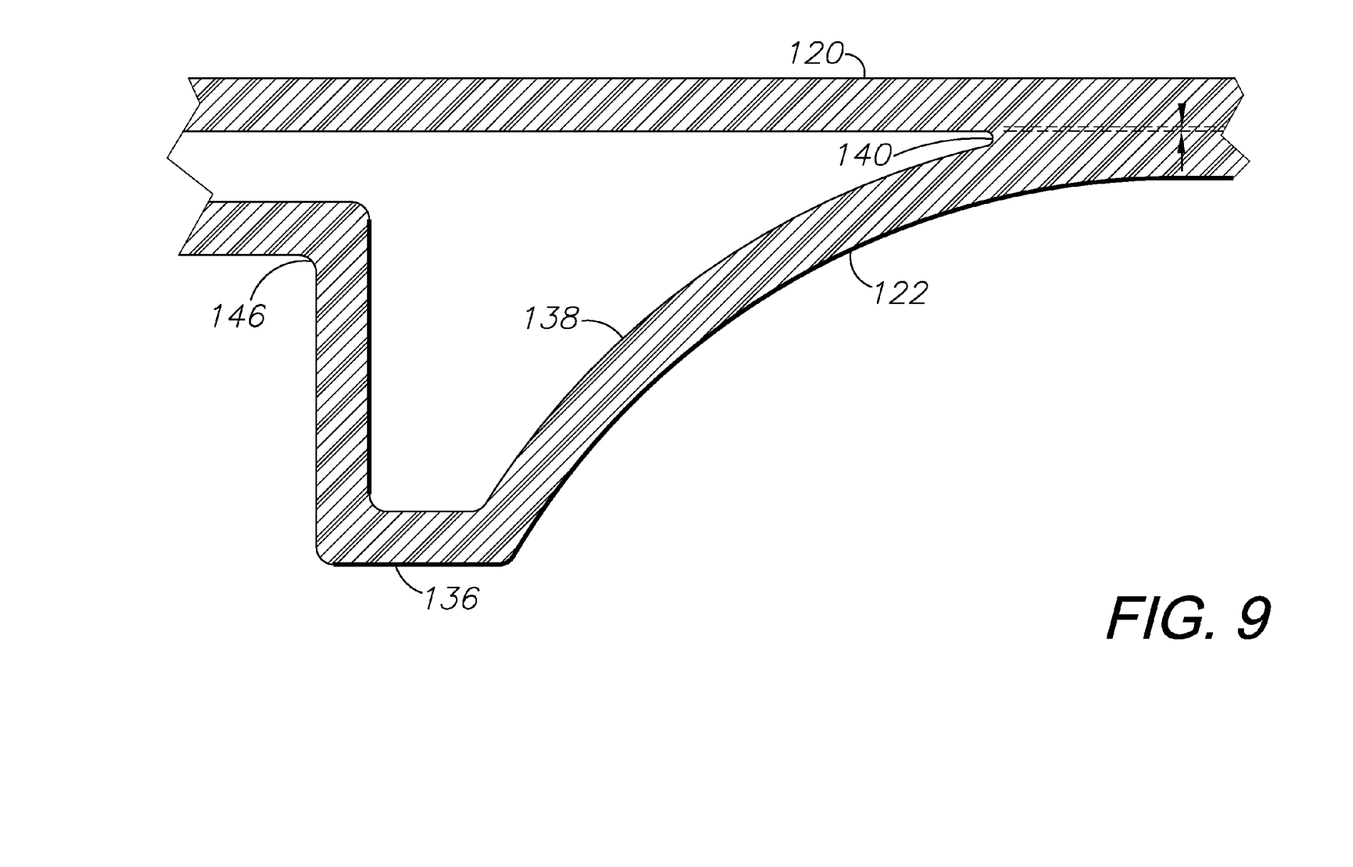
FIG. 9 is an enlarged, fragmentary, cross-sectional view thereof, taken generally within circle 9 in FIG. 8.

Referring to FIG. 9, elongated, recessed, structural channels 134 with generally semicircular cross-sectional configurations, preferably 26 inches long and 2.5 inches wide, are located at 8.0 inches on center and are integrally formed in the lower panel 123. The channels 134 extend slightly less than the width of the cover 102 between shoulders 146, are substantially parallel to the ends 116 and terminate at sloping braces 137. Cavity surfaces 138 of the channels 134 and the upper panel 121 are fused together at a kiss offs 140 overlapping by approximately 0.010 inches and Thereby providing strength and rigidity to the cover 102.

It will be appreciated that the components of the invention can be used for various other applications. Moreover, the invention can be fabricated in various sizes and from a wide range of suitable materials, using various manufacturing and fabrication techniques.

It is to be understood that while certain aspects of the invention have been shown and described, the invention is not limited thereto and encompasses various other embodiments and aspects.

Having thus described the invention, what is claimed as new and desired to be secured by Letters Patent is:

1. A cover for an opening between a spaced pair of sidewalls with top edges, which cover includes:
    upper and lower panels with upper and lower surfaces respectively, said panels being positioned in spaced relation;
    first and second opposite ends;
    first and second opposite side edges;
    a pair of flanges each flange located at a separate respective side edge;
    a pair of shoulders each shoulder extending downwardly from a respective flange and located in spaced relation inwardly from a respective side edge;
    said lower panel including an elongated recess extending generally transversely between said shoulders; and
    said lower panel being bonded to said upper panel defining a cavity between each respective flange, shoulder, and upper panel.

2. The utility trench cover of claim 1, which includes:
    said cover comprising a rotary molded plastic material; and
    said lower panel being thermally fused to said upper panel.

3. The utility trench cover of claim 2, which includes:
    said lower panel recess having a generally triangular cross-sectional configuration.

4. The utility trench cover of claim 2, which includes:
    said lower panel recess having a generally semicircular cross-sectional configuration.

5. The utility trench cover of claim 2, which includes:
    said lower panel recess having opposite ends forming braces extending generally diagonally from said lower panel adjacent said shoulder to said upper panel.

6. The utility trench cover of claim 5, which includes:
    said lower panel forming multiple said lower panel recesses; and said recesses extending generally between said shoulders in parallel, spaced relation.

7. The utility trench cover of claim 1, which includes an anti-slip pattern formed in said upper panel upper surface.

8. In combination with a utility trench including a pair of sidewalls positioned in generally parallel, spaced relation and including sidewall top edges, the improvement of a removable cover including:
  upper and lower panels with upper and lower surfaces respectively, said panels being positioned in spaced relation;
  first and second opposite ends; first and second opposite side edges;
  each panel including a pair of flanges each flange of said pair of flanges located at a separate respective side edge and extending the length of said cover between said opposite ends;
  said lower panel including a pair of shoulders each shoulder extending downwardly from a respective flange and located in spaced relation inwardly from a respective side edge;
  said lower panel including multiple elongated recesses extending generally transversely between said shoulders; and
  said lower panel being bonded to said upper panel defining a cavity between each respective lower panel flange, shoulder and upper panel flange.

9. The combination of claim 8, which includes:
multiple mounting bolt anchors embedded in said utility trench sidewalls and open at their respective top edges;
each said flange including multiple mounting bolt receivers positioned in longitudinally-spaced relation and adapted for alignment with said mounting bolt anchors; and
multiple mounting bolts each extending through a respective mounting bolt receiver and threadably received in a respective anchor.

10. The combination of claim 8, which includes:
said cover comprising a rotary molded plastic material; and
said lower panel being thermally fused to said upper panel.

11. The combination of claim 8, which includes:
said lower panel recesses having a generally triangular cross-sectional configuration.

12. The combination of claim 8, which includes:
said lower panel recesses having a generally semicircular cross-sectional configuration.

13. The combination of claim 8, which includes:
said lower panel recesses having opposite ends forming braces extending generally diagonally from said lower panel adjacent to said shoulder to said upper panel.

14. The combination of claim 8, which includes an anti-slip pattern formed in said upper panel upper surface.

15. The combination of claim 8, which includes: said utility trench comprising: multiple trench sections each having sidewalls comprising respective trench covers, a base and opposite ends; said trench sections being positioned in aligned, end-to-end relation; and each said trench section end having a pair of alignment holes; and a pair of alignment pins extending into corresponding, aligned pairs of alignment holes at the ends of adjacent trench sections.

16. The utility trench cover of claim 8 wherein each said utility trench sidewall includes multiple ports for receiving infrastructure runs extending into and out of the trench.

17. In combination with a utility trench including a pair of sidewalls positioned in generally parallel, spaced relation and including sidewall top edges, the improvement of a removable cover including:
  upper and lower panels with upper and lower surfaces respectively, said panels being positioned in spaced relation;
  first and second opposite ends;
  first and second opposite side edges;
  each panel including a pair of flanges each flange of said pair of flanges located at a separate respective side edge and extending the length of said cover between said opposite ends;
  said lower panel including a pair of shoulders each shoulder extending downwardly from the respective lower panel flange and located in spaced relation inwardly from a respective side edge;
  said lower panel including multiple elongated recesses extending generally transversely between said shoulders;
  said lower panel being thermally fused to said upper panel defining a cavity between each respective lower panel flange, shoulder, and upper panel flange;
  said upper and lower panels having approximately equal, uniform thicknesses and said cover having a thickness slightly less than twice the panel thickness where said lower panel is fused to said upper panel;
  multiple mounting bolt anchors embedded in said utility trench sidewalls and open at their respective top edges;
  each said flange including multiple mounting bolt receivers positioned in longitudinally-spaced relation and adapted for alignment with said mounting bolt anchors;
  multiple mounting bolts each extending through a respective mounting bolt receiver and threadably received in a respective anchor;
  said cover comprising a rotary molded plastic material;
  said lower panel being thermally fused to said upper panel;
  said lower panel recesses having opposite ends forming braces extending generally diagonally from said lower panel adjacent to said shoulder to said upper panel;
  an anti-slip pattern formed in said upper panel upper surface; and
  said utility trench comprising: multiple trench sections each having sidewalls, a base and opposite ends; said trench sections being positioned in aligned, end-to-end relation; and each said trench section end having a pair of alignment holes; and a pair of alignment pins extending into corresponding, aligned pairs of alignment holes at the ends of adjacent trench sections.

18. The combination of claim 17, which includes:
said lower panel recesses having a generally triangular cross-sectional configuration.

19. The combination of claim 17, which includes:
said lower panel recesses having a generally semicircular cross-sectional configuration.

* * * * *